United States Patent [19]

Prioste

[11] 4,263,660
[45] Apr. 21, 1981

[54] EXPANDABLE ARITHMETIC LOGIC UNIT

[75] Inventor: Jerry E. Prioste, Scottsdale, Ariz.

[73] Assignee: Motorola, Inc., Schaumburg, Ill.

[21] Appl. No.: 50,382

[22] Filed: Jun. 20, 1979

[51] Int. Cl.³ .............................................. G06F 7/48
[52] U.S. Cl. .................................................. 364/716
[58] Field of Search ................ 364/716, 783, 786, 787

[56] References Cited

U.S. PATENT DOCUMENTS

| 3,711,693 | 1/1973 | Dahl | 364/716 X |
| 3,805,045 | 4/1974 | Larsen | 364/787 |
| 3,925,651 | 12/1975 | Miller | 364/787 X |
| 4,138,731 | 2/1979 | Kamimoto et al. | 364/783 |

Primary Examiner—David H. Malzahn
Attorney, Agent, or Firm—Vincent B. Ingrassia

[57] ABSTRACT

This relates to an expandable arithmetic logic unit (ALU) capable of performing binary and BCD addition and subtraction and various logic transfer functions in no more than four stages of logic delay from data input to ALU output. Propagate and generate signals (Pi and Gi) are produced in a single stage of delay and are applied to group propagate and generate logic. The group propagate and group generate signals are produced in a second stage of logic delay and are utilized to form carry look-ahead signals in a third stage of logic delay. Additional logic produces the required logic transfer signals (Hi) one logic delay after generation of the individual Pi and Gi terms. The carry look-ahead signals and logic transfer signals are combined to produce the ALU output.

10 Claims, 18 Drawing Figures

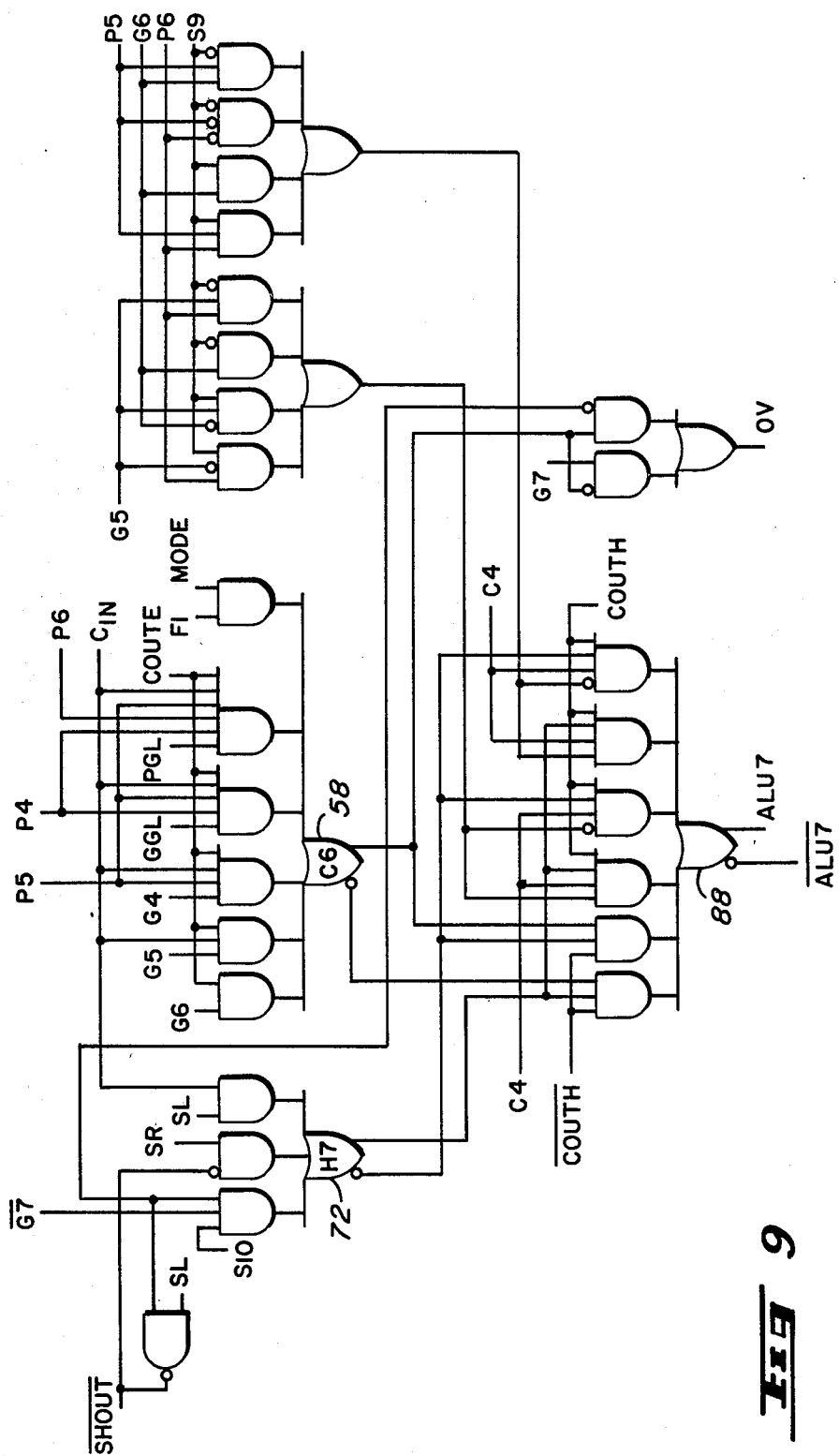

EXPANDABLE ARITHMETIC LOGIC UNIT

BACKGROUND OF THE INVENTION

1. Field of the Invention

This invention relates generally to an arithmetic logic unit (ALU), and more particuclary to an eight-bit expandable ALU for performing binary and binary coded decimal (BCD) arithmetic and various logic and transfer operations while incurring only four gate delays.

2. Description of the Prior Art

The semiconductor industry is constantly faced with demands for large scale integrated circuits (LSI) having expanded capabilities and higher operational speeds. For example, modern ALU integrated circuits must perform a variety of functions including binary and BCD addition and subtraction and a number of logic and transfer operations (e.g. shift right, shift left, invert, etc.).

One such multipurposed ALU (an LSI four-bit ALU slice) is manufactured by Motorola Semiconductor Products, Inc. and bears part number MC10800. This ALU has the capability of performing logic operations, binary arithmetic and BCD arithmetic on combinations of one, two or three variables. It incorporates a nine's complement circuit to generate the necessary BCD complement function and generates group propagate and generate signals which are used for external look-ahead carry between four-bit slice circuits. A carry-in (Cin) signal interconnects four-bit slice circuits and is used for both binary and BCD arithmetic operations. A carry-out (Cout) signal indicates that a calculated value in the ALU has exceeded the maximum capacity of the four ALU output lines.

The above described device uses the conventional BCD addition algorithm to perform subtraction; i.e., forming the nine's complement of the subtrahend. The binary sum is then corrected to obtain the BCD sum. This approach not only requires a large number of logic elements, but also involves a large number of logic stages of delay between the ALU inputs and outputs.

In an article entitled "High Speed Decimal Addition" by Martin S. Schmookler at al, IEEE Transactions on Computers, Vol, C-20, No. 8 August 1971, pages 862–865, there is described a design for a high speed and economical decimal adder wherein there is produced decimal sums without first producing the corresponding binary sums. However, this decimal unit does not include binary arithmetic capabilities.

SUMMARY OF THE INVENTION

It is an object of the present invention to provide a faster and more economical ALU.

It is a further object of the invention to provide an improved ALU suitable for LSI implementation.

It is a still further object of the invention to provide an improved ALU capable of performing binary and BCD arithmetic functions in addition to a plurality of logic transfer functions.

Finally, it is an object of the present invention to provide an improved ALU capable of performing binary and BCD arithmetic functions and a variety of logic transfer functions in no more than four logic stages of delay.

According to a broad aspect of the invention there is provided an arithmetic logic unit (ALU) for performing binary and BCD arithmetic and a plurality of logic functions on at least first and second data input sets Ai and Bi where i is an integer which varies from 0 to n, comprising: selection means for enabling said ALU to perform a desired function, said selection means producing a plurality of enabling signals; first logic means coupled to said selection means and to said data input sets for generating propagate (Pi) and generate (Gi) signals informative of the existence of carry out signals which would result from the combination of bits of equal significance in said at least first and second data sets, said first logic means producing said propagate and generate signals in a first single state of logic delay; second logic means coupled to said first logic means for producing group propagate and group generate signals informative of the existence of carry out signals which would result from the combination of predetermined subsets of equal significance of said at least first and second data sets, said second logic means producing said group propagate and group generate signals in a second single state of logic delay; carry look-ahead means coupled to said first and second logic means for generating carry signals Ci in a third single state of logic delay; third logic means coupled to said selection means and to said first logic means for generating signals Hi representative of half-sums of corresponding bits in said at least first and second data sets, said third logic means producing said half-sums in said second stage of logic delay; and fourth logic means coupled to said third logic means and to said carry look-ahead means for combining said half sums Hi and said carry signals Ci to produce a desired ALU output in a fourth single stage of logic delay.

The above and other objects, features and advantages of the invention will be more clearly understood from the following detailed description taken in conjunction with the accompanying drawings, in which:

BRIEF DESCRIPTION OF THE DRAWINGS

FIGS. 8A–8F are detailed logic diagrams of the logic transfer unit, the carry look ahead and the ALU logic shown in FIG. 1; and FIG. 9 is a drawing guide illustrating the relationship between FIGS. 8A–8F.

DESCRIPTION OF THE PREFERRED EMBODIMENT

Figure 1:
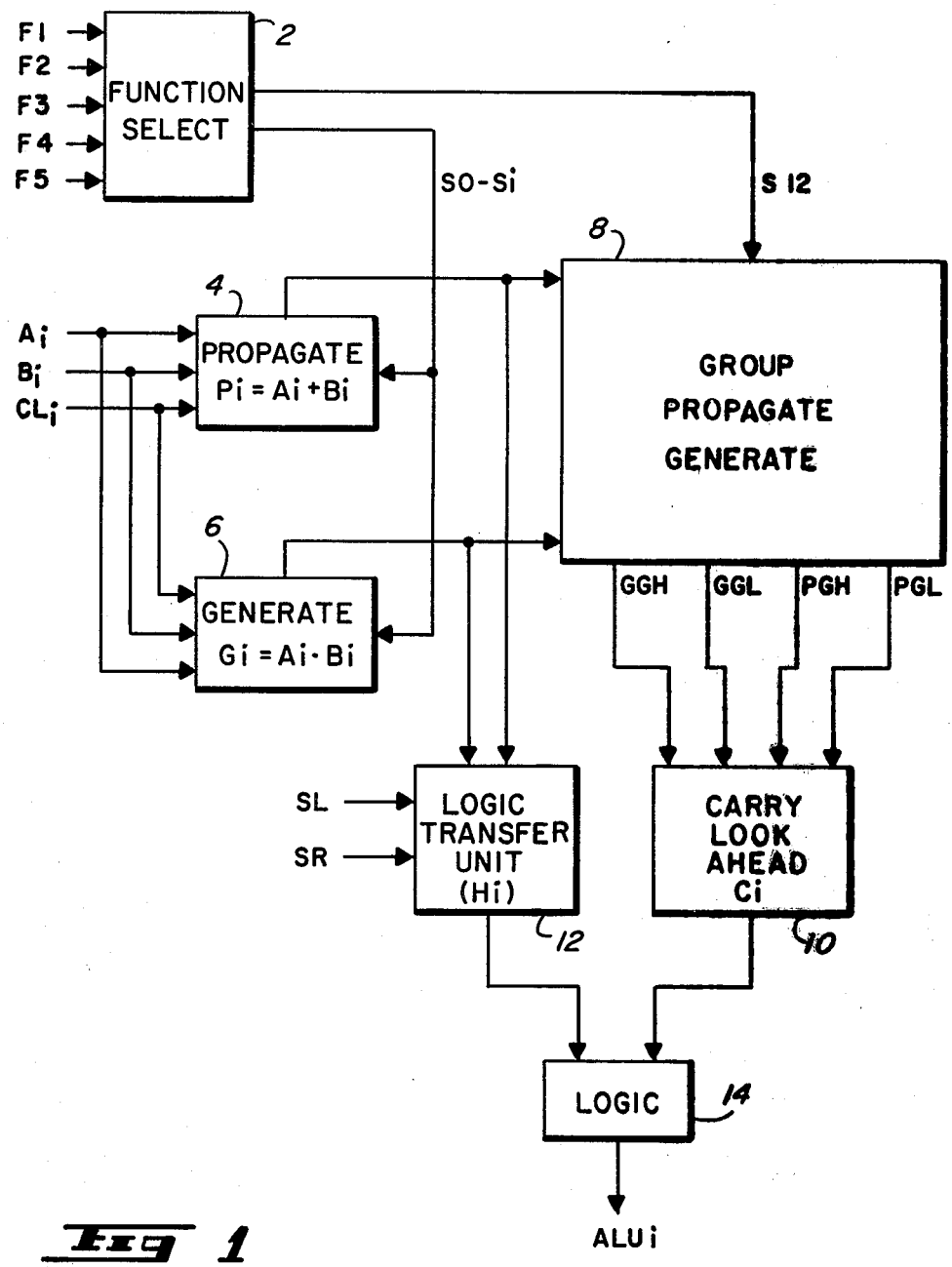
FIG. 1 is a block diagram of the inventive arithmetic logic unit.

FIG. 1 illustrates in block diagram form, the major sections of the inventive ALU. First, a plurality of function select signals F1–F5 are applid to function select logic 2 which in turn generates a plurality of enabling signals which, as will be explained in more detail below, condition the ALU to perform a specific operation (e.g. binary add, BCD substract, shift right, etc.).

Table I indicates ALU operation as a function of the potential levels on function select lines F1–F5 where L="low," H="high," x="don't care," and negative logic is employed.

TABLE I

| Function Number | F1 | F2 | F3 | F4 | F5 | Function Description |
|---|---|---|---|---|---|---|
| 1 | H | H | H | L | X | CLi → ALU |
| 2 | H | H | L | H | H | BCD Subtract (Unpacked) A − B + Cin |
|  | H | H | L | H | L | BCD Subtract (Packed) A − B + Cin |
| 3 | H | H | L | L | H | BCD Add (Unpacked) A + B + Cin |
|  | H | H | L | L | L | BCD Add (Packed) A + B + Cin |
| 4 | H | L | H | H | X | Binary Subtract (B − A + Cin) |
| 6 | H | L | L | H | X | Binary Subtract (A − B + Cin) |
| 7 | H | L | L | L | H | Binary Add (CL + B + Cin) |
|  | H | L | L | L | L | Binary Add (A + B + Cin) |
| 8 | L | H | H | H | H | Left Shift A |
|  | L | H | H | H | L | Right Shift A |
| 9 | L | H | H | L | H | Left Shift B |
|  | L | H | H | L | L | Right Shift B |
| A | H | L | H | L | H | A → ALU |
|  | H | L | H | L | L | $\overline{A}$ → ALU |
| C | H | H | L | L | H | B → ALU |
|  | H | H | L | L | L | $\overline{B}$ → ALU |
| E | H | L | L | L | H | CL → ALU |
|  | H | L | L | L | L | $\overline{CL}$ → ALU |
| B | L | L | H | L | H | A . B → ALU |
|  | L | L | H | L | L | $\overline{A + B}$ → ALU |
| D | L | H | L | L | H | A + B → ALU |
|  | L | H | L | L | L | $\overline{A . B}$ → ALU |
| F | L | L | L | L | X | A ⊕ B → ALU |

As can be seen from Table I, the function number equals the hexadecimal value of function select outputs F1–F4. The inventive ALU is capable of performing binary arithmetic functions (functions 4, 6 and 7), BCD arithmetic functions (functions 2 and 3), logic functions (functions B, D and F) and transfer functions (functions 1, 8, 9, A, C and E).

Referring back to FIG. 1, a group of enabling signals (So–Si), from function select 2 are applied to propagate and generate multiplexers, 4 and 6 respectively, as is data which is present on three input data busses A, B and CL. The propagate multiplexer 4 generates signals in accordance with the logic function Pi=Ai+Bi where "+" represents a logical "OR" function. Pi is enabled by the signals So–Si from function select 2. Similarly, the generate multiplexer 6 generates signals in accordance with the logic function Gi=Ai·Bi where "." represents a logical "AND" function. The generate multiplexer is likewise enabled by signals from function select 2 as will be more fully described below. It is important to note, however, that the propagate and generate signals Pi and Gi are to be generated from the Ai, Bi, Cli and Si inputs in a single stage of logic delay.

The propagate and generate outputs from multiplexers 4 and 6 are applied to group propagate and generate unit 8. Additional control is also supplied to unit 8 such as a signal from function select 2 indicating that BCD addition is to be performed. Group propagate signals for the upper and lower order bits (PGH and PGL) and group generate signals for the upper and lower order bits (GGH and GGL) are computed in unit 8 and applied as are the individual propagate and generate signals to carry look-ahead unit 10. The carry look-ahead is employed during ALU arithmetic functions. It should be noted at this point that the generation of the group propagate and group generate signals is to require only one stage of logic delay, and that the generation of the carry look ahead Ci is to require only one additional stage of logic delay.

The propagate and generate signals from multiplexers 4 and 6 are likewise applied to logic transfer unit 12 along with certain control signals generated by function select 2 (i.e. SL=shift left and SR=shift right). The resulting logic transfer function Hi represents, among other things, the half sum of bits Ai and Bi; i.e. without reference to potential carry signals, and is to be generated within one stage of logic delay from the propagate and generate (Pi, Gi) signals. This, logic transfer functions Hi and carry-look ahead Ci are both available at inputs to ALU combination logic 14 within three stages of delay after signals representative of the desired function are applied to multiplexers 4 and 6 (Si) along with bus data (Ai, Bi or CLi). Only one more logic stage of delay is required in logic 14 which combines the Hi and carry look-ahead signals to produce the ALU binary and BCD arithmetic results and logic shifts at outputs ALUi.

Figure 2A:
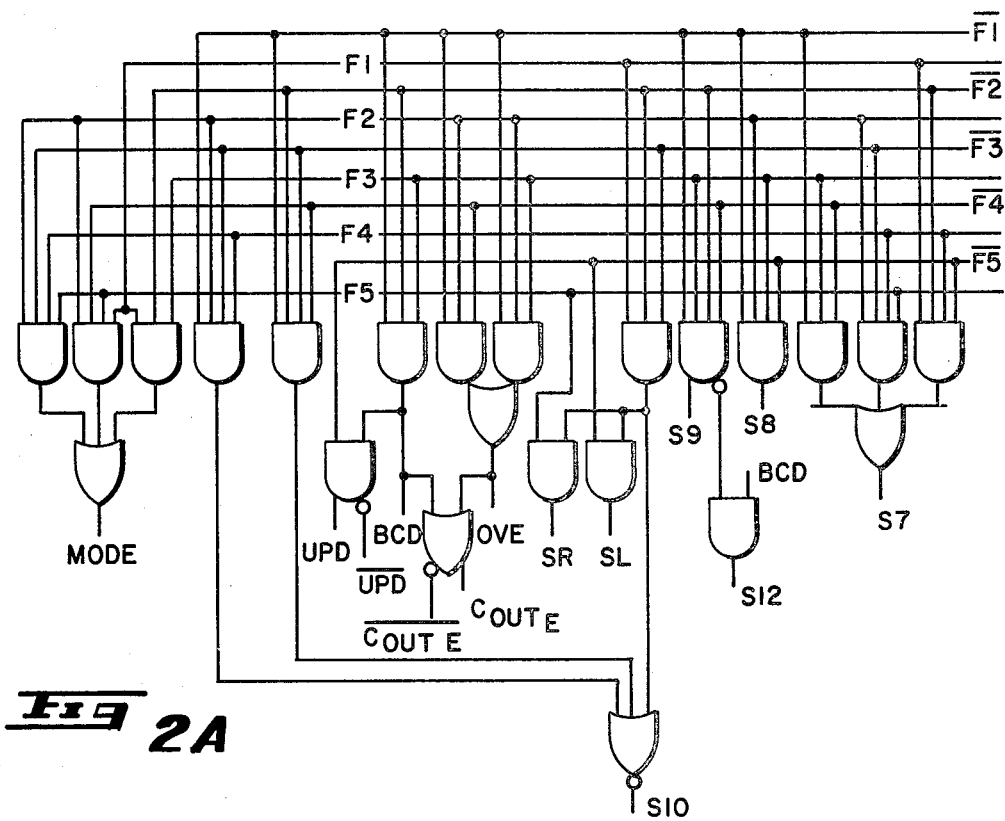
FIGS. 2A–2B are detailed logic diagrams of the function select unit shown in FIG. 1.
Figure 2B:
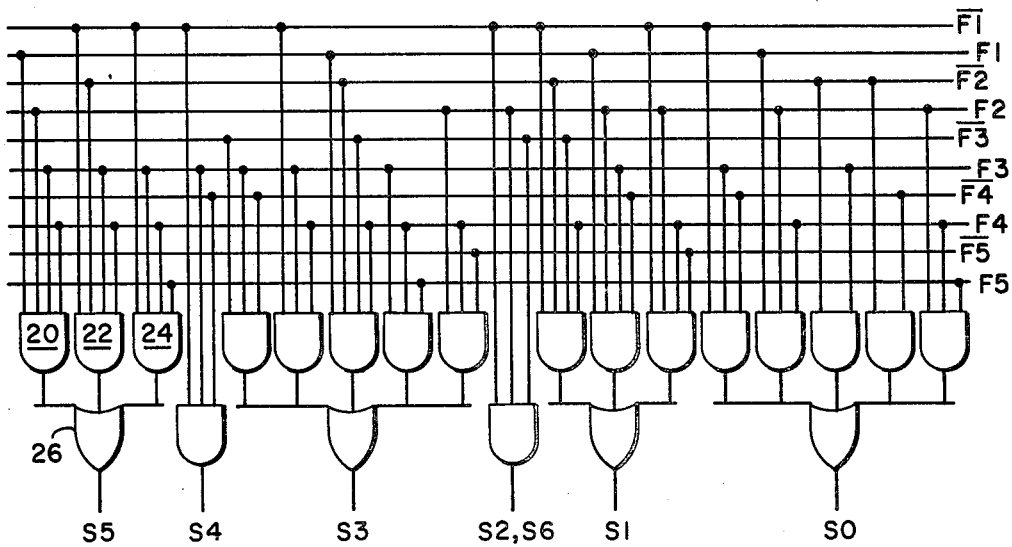
Figure 5A:
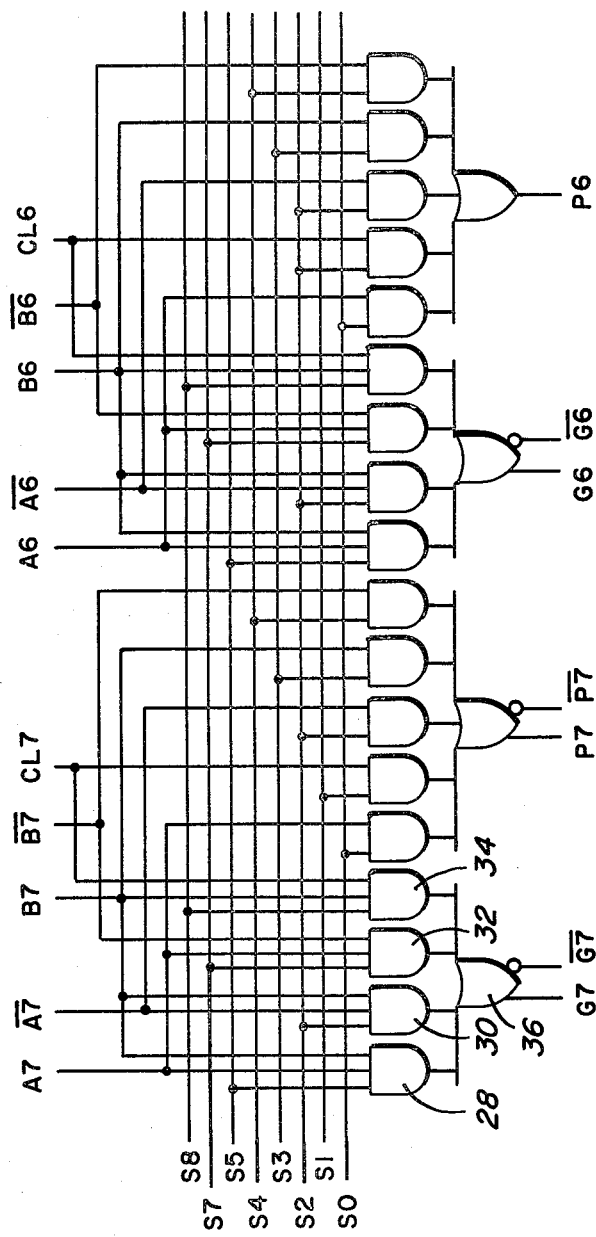
FIGS. 5A–5D are detailed logic diagrams of the propagate and generate multiplexers.
Figure 4:
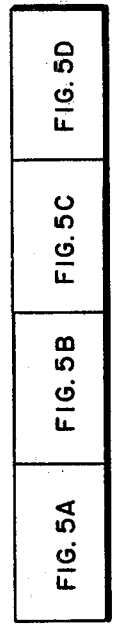
FIG. 4 is a drawing guide illustrating the relationship between FIGS. 5A–5D.
Figure 3:
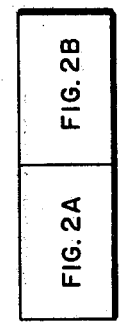
FIG. 3 is a drawing guide illustrating the relationship between FIGS. 2A–2B.
Figure 5B:
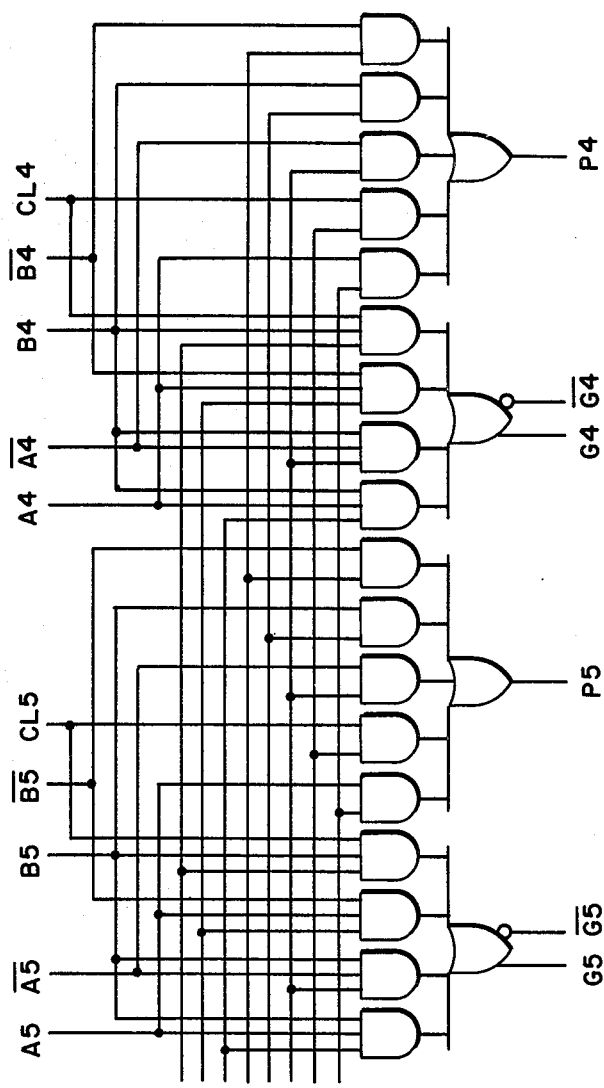
Figure 5C:
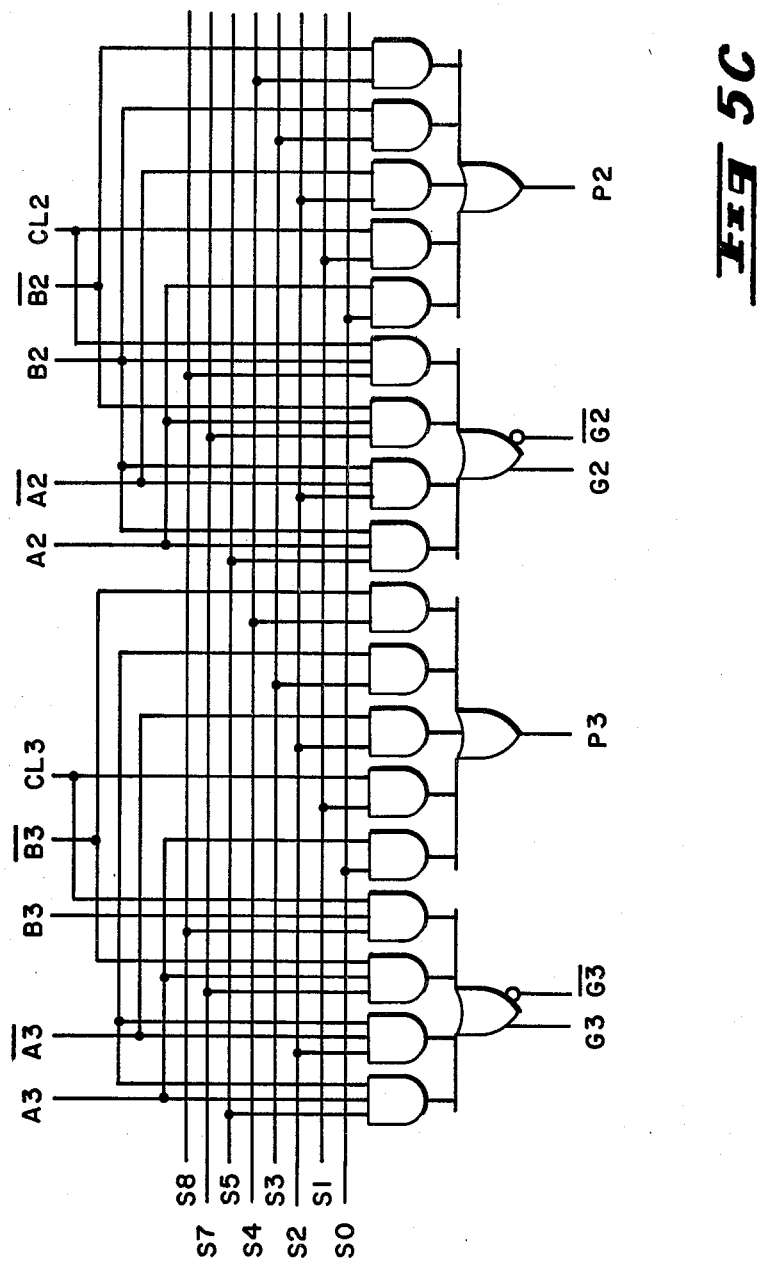
Figure 5D:
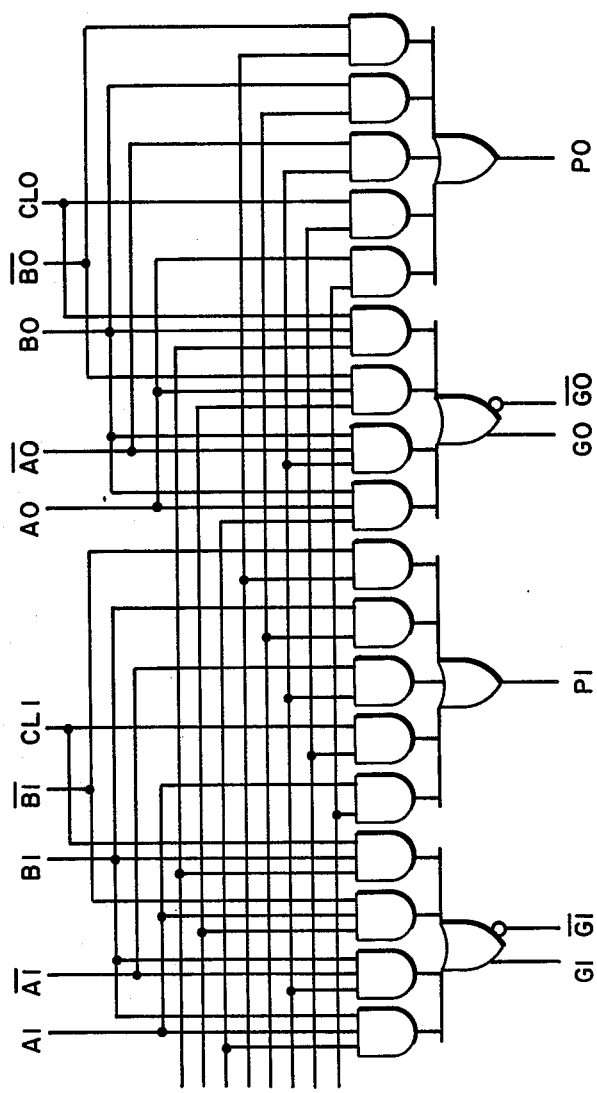

FIGS. 2A–2B are detailed logic diagrams of the function select unit shown in FIG. 1 for an eight-bit expandable ALU. The enabling signals generated by the function select apparatus of FIGS. 2A–2B may be defined by the following logic equations:

$$S_0 = \overline{F1} . F3 . \overline{F4} + F1 . F2 . F4 + \overline{F2} . F3 + \overline{F2} . \overline{F4} + F2 . F4 . F5$$

$$S_1 = \overline{F1} . \overline{F2} . \overline{F3} . F4 + F1 . F2 . F3 . \overline{F4} + \overline{F1} . F2 . F4 . \overline{F5}$$

$$S_2 = \overline{F1} . F2 . \overline{F3}$$

$$S_3 = F2 . \overline{F3} . \overline{F4} + \overline{F1} . F3 . F4 + F1 . \overline{F2} . \overline{F3} . F4 + F3 . F4 . F5 + F2 . F4 . \overline{F5}$$

$$S_4 = \overline{F1} . F3 . \overline{F4}$$

$$S_5 = F1 . F2 . F3 . F4 + \overline{F1} . \overline{F2} . F3 . F4 + \overline{F1} . F3 . F4 . F5$$

$$S_6 = S_2 = \overline{F1} . F2 . \overline{F3}$$

$$S_7 = \overline{F1} . F3 . \overline{F4} + F2 . \overline{F3} . F4 . F5 + F1 . \overline{F2} . F4 . \overline{F5}$$

$$S_8 = \overline{F1} . F2 . F4 . \overline{F5}$$

$$S_9 = \overline{F1} . \overline{F2} . F3 . \overline{F4}$$

$$\overline{S_{10}} = F1 . \overline{F2} . \overline{F3} + FCT0 + FCT5$$
$$= F1 . \overline{F2} . \overline{F3} + \overline{F1} . \overline{F2} . \overline{F3} . \overline{F4} + \overline{F1} . F2 . \overline{F3} . F4$$

-continued $S12 = \overline{S9} \cdot BCD = \overline{S9} \cdot \overline{F1} \cdot \overline{F2} \cdot F3$ $SL = F1 \cdot \overline{F2} \cdot \overline{F3} \cdot \overline{F5}$ $SR = F1 \cdot \overline{F2} \cdot \overline{F3} \cdot F5$ $BCD = \overline{F1} \cdot \overline{F2} \cdot F3$ $MODE = \overline{F2} \cdot F3 \cdot F5 \cdot F1 + F1 \cdot F2 \cdot \overline{F4} \cdot F5 + F2 \cdot \overline{F3} \cdot F4 \cdot F5$ $OVE = \overline{F1} \cdot F2 \cdot F3 + \overline{F1} \cdot F2 \cdot \overline{F4}$ $COUTe = BCD + OVE$
$= \overline{F1} \cdot \overline{F2} \cdot F3 + \overline{F1} \cdot F2 \cdot F3 + \overline{F1} \cdot F2 \cdot \overline{F4}$ $UPD = \overline{F1} \cdot \overline{F2} \cdot F3 \cdot \overline{F5}$ Where:
S0 selects Ai in the Pi equation;
S1 selects CLi in the Pi equation;
S2 selects $\overline{Ai}$ in the Pi equation;
S3 selects Bi in the Pi equation;
S4 selects $\overline{Bi}$ in the Pi equation;
S5 selects Ai·Bi in the Gi equation;
S6 selects $\overline{Ai}$·Bi in the Gi equation;
S7 selects Ai·$\overline{Bi}$ in the Gi equation;
S8 selects CLi·Bi in the Gi equation;

S9 enables BCD subtract function;
S10 forces Pi·$\overline{Gi}$ term in Hi to zero;
S12 enables BCD add function;
SL enables shift left function;
SR enables shift right function;
BCD enables BCD arithmetic operations;
MODE gates invert terms into carry logic;
OVE enables overflow detection during binary arithmetic operations;
COUTe enables the carry look-ahead logic; and
UPD is the unpacked digit select line for BCD arithmetic operations.

In the logic circuit shown in FIGS. 2A–2B as in the logic circuits to be described below, multiple AND gates such as is shown at 20, 22 and 24 connected to the inputs of an OR gate (e.g. 26) can be produced in one gate delay using the conventional collector DOT technique well known to those skilled in the art of emitter coupled logic design. Furthermore, an AND-OR invert function can be produced by connecting the complement outputs of a plurality of AND gates together using the well known emitter DOT technique.

The inputs to the ALU (i.e. data on the A, B, and CL busses) are combined in the propagate and generate multiplexers shown in FIGS. 5A–5D. The propagate and generate signals produced may be defined by the following equations:

$P0 = A0 \cdot S0 + CL0 \cdot S1 + \overline{A0} \cdot S2 + B0 \cdot S3 + \overline{B0} \cdot S4$ $G0 = A0 \cdot B0 \cdot S5 + \overline{A0} \cdot B0 \cdot S6 + A0 \cdot \overline{B0} \cdot S7 + CL0 \cdot B0 \cdot S8$ $P1 = A1 \cdot S0 + CL1 \cdot S1 + \overline{A1} \cdot S2 + B1 \cdot S3 + \overline{B1} \cdot S4$ $G1 = A1 \cdot B1 \cdot S5 + \overline{A1} \cdot B1 \cdot S6 + A1 \cdot \overline{B1} + S7 + CL1 \cdot B1 \cdot S8$ $P2 = A2 \cdot S0 + Cl2 \cdot S1 + \overline{A2} \cdot S2 + B2 \cdot S3 + \overline{B2} \cdot S4$ $G2 = A2 \cdot B2 \cdot S5 + \overline{A2} \cdot B2 \cdot S6 + A2 \cdot \overline{B2} \cdot S7 + CL2 \cdot B2 \cdot S8$ $P3 = A3 \cdot S0 + CL3 \cdot S1 + \overline{A3} \cdot S2 + B3 \cdot S3 + \overline{B3} \cdot S4$ $G3 = A3 \cdot B3 \cdot S5 + \overline{A3} \cdot B3 \cdot S6 + A3 \cdot \overline{B3} \cdot S7 + CL3 \cdot B3 \cdot S8$ $P4 = A4 \cdot S0 + CL4 \cdot S1 + \overline{A4} \cdot S2 + B4 \cdot S3 + \overline{B4} \cdot S4$ $G4 = A4 \cdot B4 \cdot S5 + \overline{A4} \cdot B4 \cdot S6 + A4 \cdot \overline{B4} \cdot S7 + CL4 \cdot B4 \cdot S8$ $P5 = A5 \cdot S0 = CL5 \cdot S1 + \overline{A5} \cdot S2 + B5 \cdot S3 + \overline{B5} \cdot S4$ $G5 = A5 \cdot B5 \cdot S5 + \overline{A5} \cdot B5 \cdot S6 + A5 \cdot \overline{B5} \cdot S7 + CL5 \cdot B5 \cdot S8$ $P6 = A6 \cdot S0 + CL6 \cdot S1 + \overline{A6} \cdot S2 + B6 \cdot S3 + \overline{B6} \cdot S4$ $G6 = A6 \cdot B6 \cdot S5 + \overline{A6} \cdot B6 \cdot S6 + A6 \cdot \overline{B6} \cdot S7 + CL6 \cdot B6 \cdot S8$ $P7 = A7 \cdot S0 + CL7 \cdot S1 + \overline{A7} \cdot S2 + B7 \cdot S3 + \overline{B7} \cdot S4$ $G7 = A7 \cdot B7 \cdot S5 + \overline{A7} \cdot B7 \cdot S6 + A7 \cdot \overline{B7} \cdot S7 + CL7 \cdot B7 \cdot S8$ Each multiplexer (one for generating Pi and one for generating Gi where i=0 through 7) comprises a plurality of AND gates (e.g. 28, 30, 32 and 34) each having an output coupled to inputs of an OR gate (e.g. 36). The AND gates have inputs coupled to the true and/or complement data signals from the A, B and CL busses as is shown in FIGS. 2b and 2c. This data is selectively enabled through the AND gates by the function select signals described above. Thus, the ALU inputs are combined in the propagate and generate multiplexers and gated by the function select signals to produce the P and G terms in only one stage of logic delay.

Figure 6:
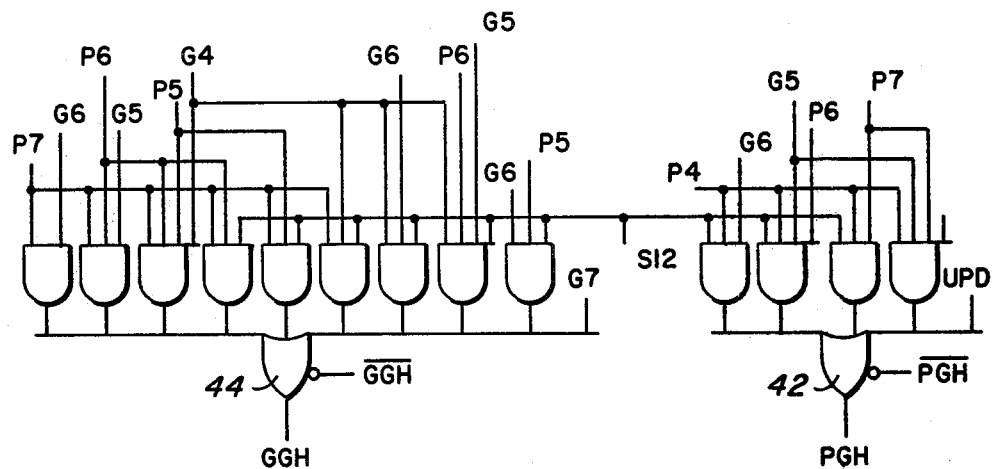
FIGS. 6 and 7 are detailed logic diagrams of the group propagate and group generate logic.
Figure 7:
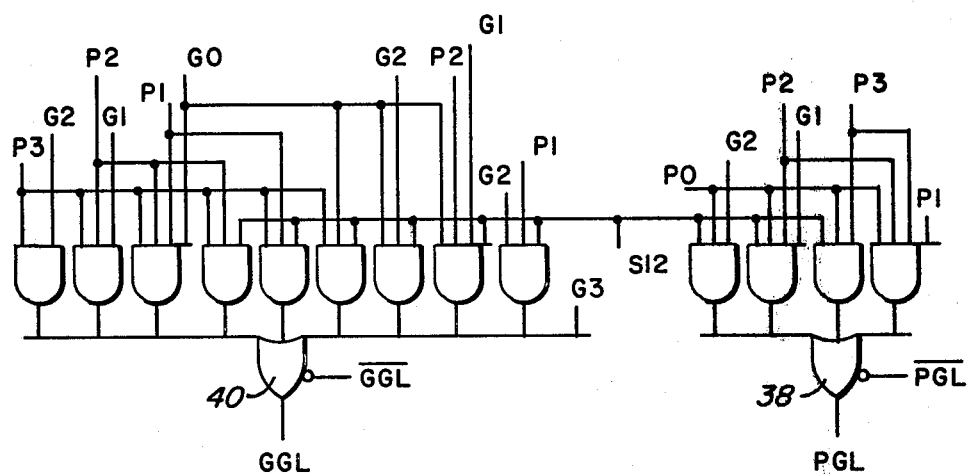
Figure 8B:
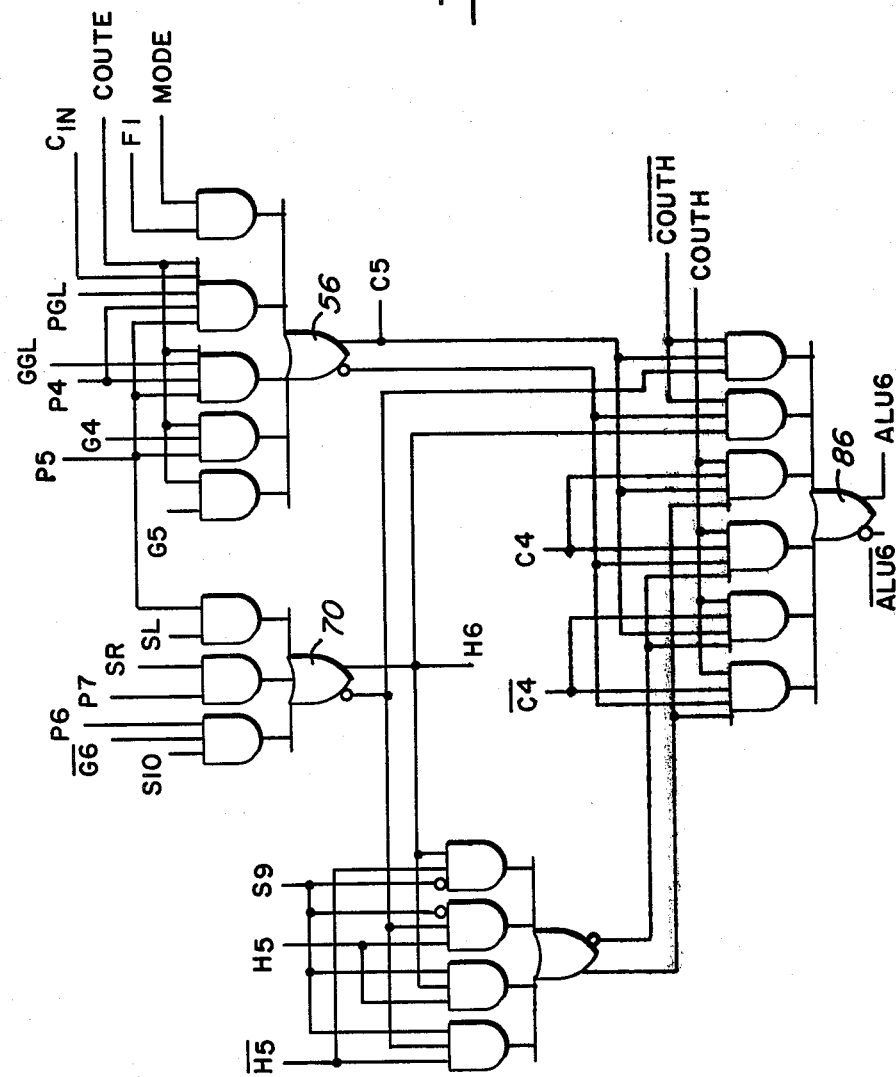
Figure 8C:
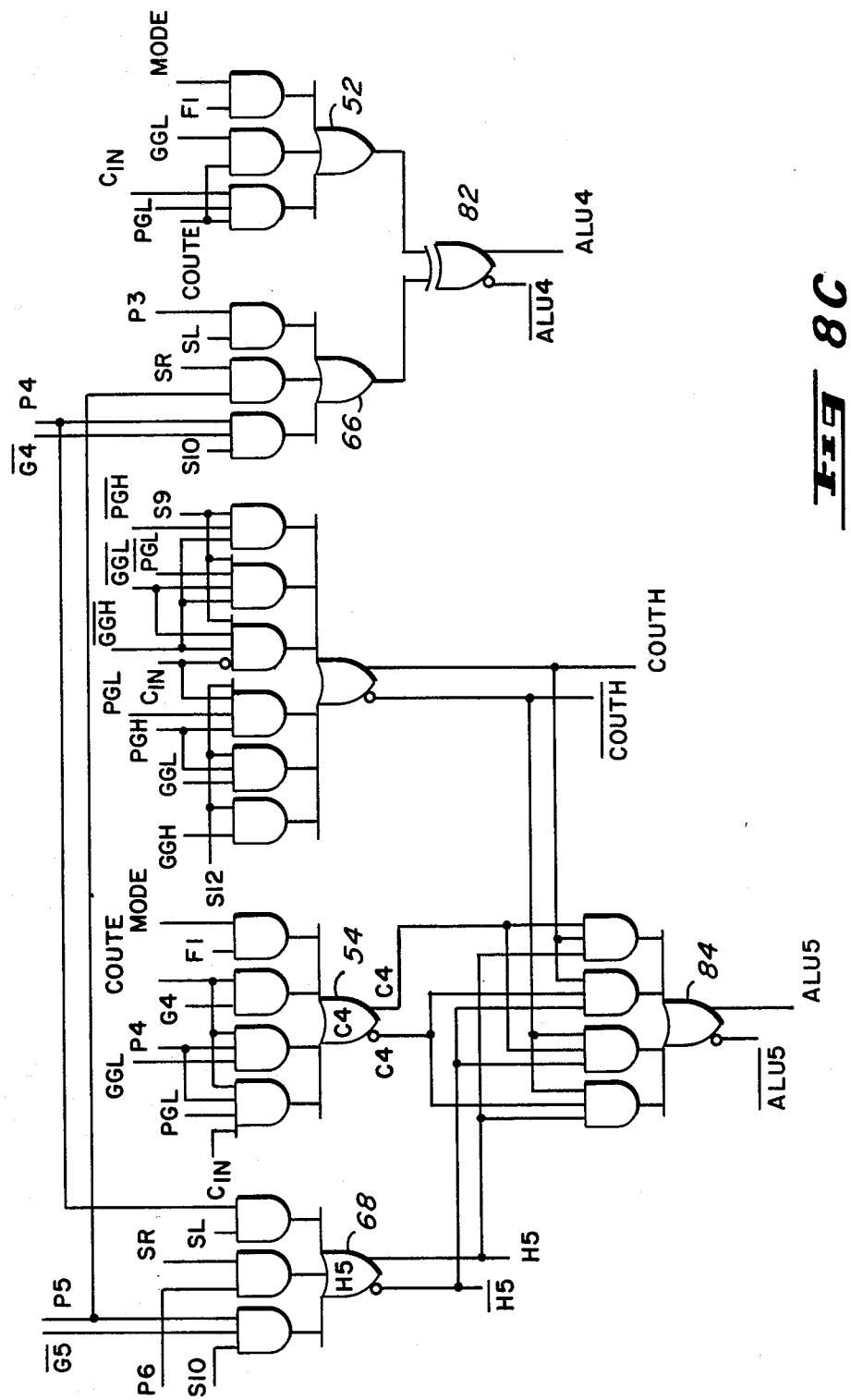
Figure 8D:
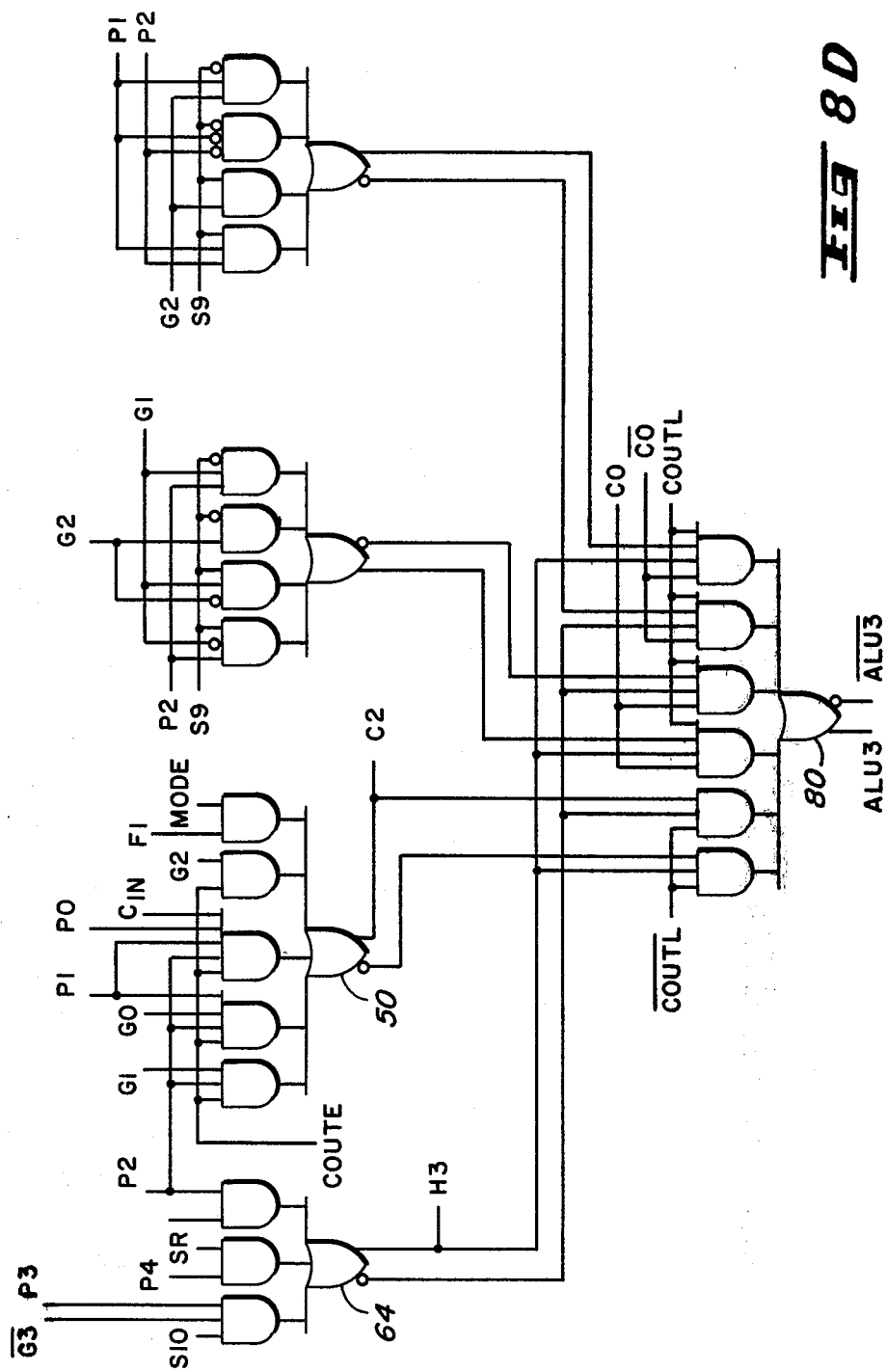
Figure 8E:
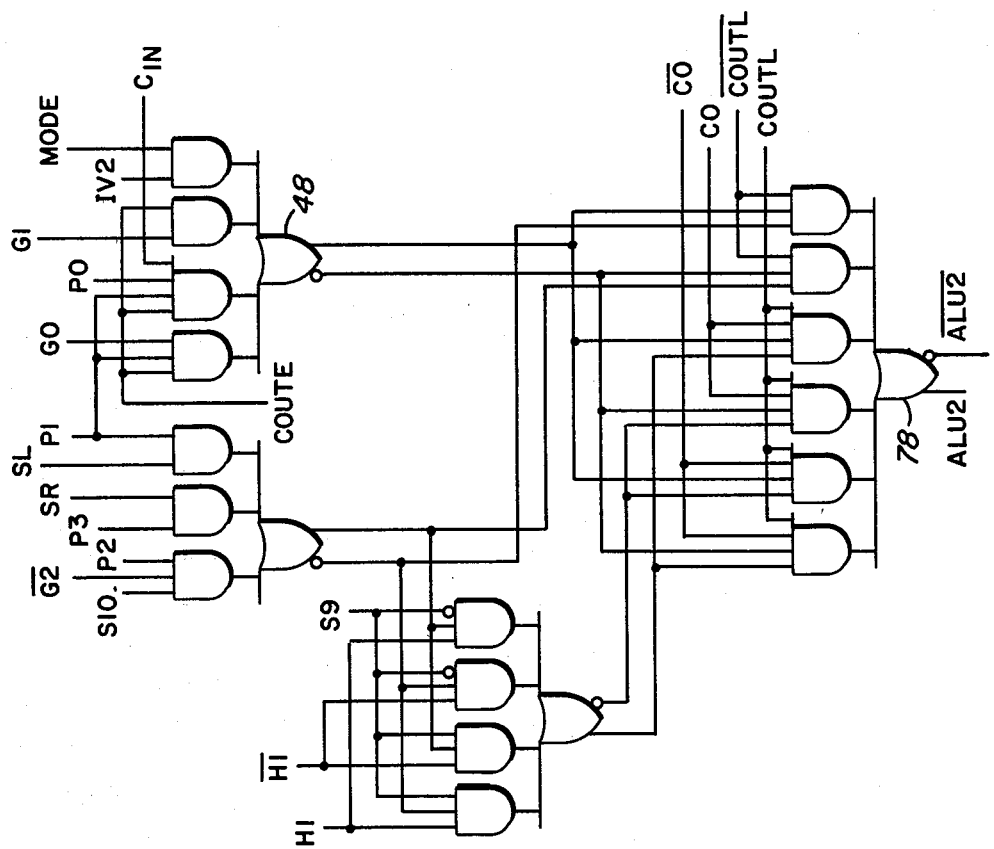
Figure 8F:
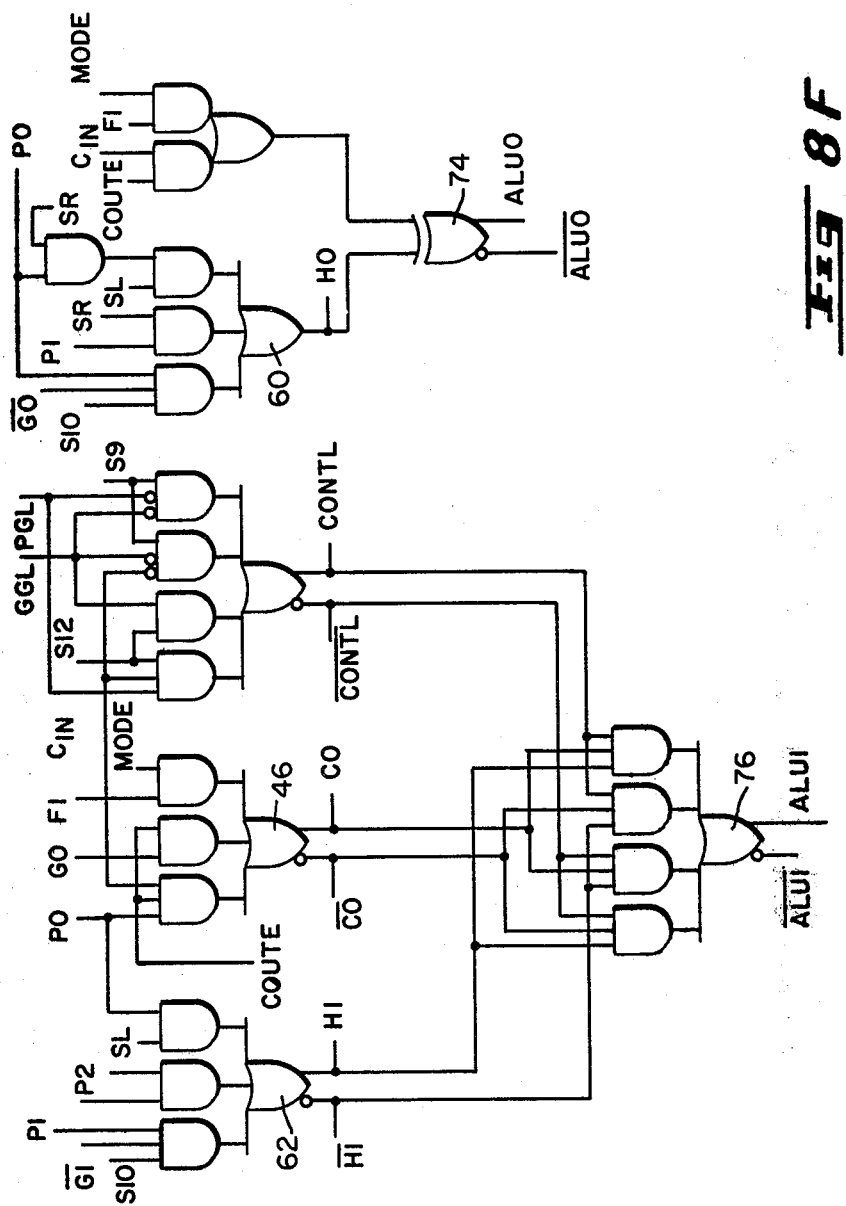

FIGS. 6 and 7 illustrate the logic for generating the group propagate and group generate signals referred to above. These may be defined by the following logic equations:

$$PGH = UPD + P7 \cdot P6 \cdot P5 \cdot P4 + S12 \cdot (P4 \cdot P7 + G6 + P4 \cdot G5 \cdot P6)$$
$$UPD = \overline{F5} \cdot BCD$$
$$PGL = P0 \cdot P1 \cdot P2 \cdot P3 + S12 \cdot (P0 \cdot P3 + P0 \cdot G2 + P0 \cdot G1 \cdot P2)$$
$$GGH = G7 + P7 \cdot G6 + P7 \cdot P6 \cdot G5 + P7 \cdot P6 \cdot P5 \cdot G4 + S12 \cdot (P6 \cdot P7 + P5 \cdot P7 +$$
$$G6 \cdot P5 + P7 \cdot G4 + G6 \cdot G4 + P6 \cdot G5 \cdot G4)$$
$$GGL = G3 + P3 \cdot G2 + P3 \cdot P2 \cdot G1 + P1 \cdot P2 \cdot P3 \cdot G0 + S12 \cdot (P2 \cdot P3 +$$
$$P1 \cdot P3 + P1 \cdot G2 + P3 \cdot G0 + G0 \cdot G2 + G0 \cdot G1 \cdot P2)$$

where

PGL is the group propagate signal for the lower four bits;

PGH is the group propagate signal for the higher four bits;

GGL is the group generate signal for the lower four bits; and

GGH is the group generate signal for the higher four bits.

It should be clear that the group propagate and group generate signals are generated within one logic stage of delay after generation of the individual propagate and generate signals (Pi and Gi). As can be seen from FIG. 7, certain ones of the lower order propagate and generate signals are supplied to inputs of a plurality of AND gates some of which have outputs coupled to inputs of OR gate 38 and others of which have outputs coupled to inputs of OR gate 40. In certain cases, the individual lower order P and G terms are gated through the AND gates by function select signal S12 which enables the BCD add function. The result is the production of the lower order group propagate and generate signals PGL and GGL and their complements PGL and GGL. The higher order group propagate and generate signals are similarly produced at the outputs of OR gates 42 and 44 respectively.

FIGS. 8A–8F are detailed logic diagrams of the logic transfer unit 12, the carry look-ahead 10 and the ALU logic 14 shown in FIG. 1. The carry look-ahead terms (C0 through C6) for each ALU bit are generated at the outputs of OR gates 46, 48, 50, 52, 54, 46 and 58 respectively; i.e., one logic stage of delay from the generation of the group propagate and generate signals and the individual Pi and Gi terms. The H terms (H0 through H7) are generated at the outputs of OR gates 60, 62, 64, 66, 68, 70 and 72 respectively, only one logic stage from the genration of the individual Pi and Gi terms. Only one additional logic stage of delay is required to produce the ALU binary and BCD arithmetic results (ALU0 through ALU7) at the outputs of OR gates 74, 76, 78, 80, 82, 84, 86 and 88 respectively; a total of four logic stages of delay from data input to ALU output.

The ALU outputs (ALU0–ALU7) may be defined by the following logic equations:

$$ALU0 = (Cin \cdot Coute + F1 \cdot MODE) \oplus H0$$
$$H0 = P0 \cdot \overline{G0} \cdot S10 + P1 \cdot SR + SHCI \cdot SL + R8 \cdot S11$$
$$ALU1 = C0 \oplus H1 \oplus Cout1$$
$$C0 = (G0 + P0 \cdot Cin) \cdot Coute + F1 \cdot MODE$$

$$H1 = P1 \cdot \overline{G1} \cdot S10 + P2 \cdot SR + P0 \cdot SL$$

$$Cout1 = (GGL + PGL \cdot Cin) \cdot S12 + (\overline{GGL} \cdot \overline{PGL} + \overline{GGL} \cdot \overline{Cin}) \cdot S9$$

$$ALU2 = (C1 \oplus H2) \cdot \overline{Cout1} + (H21 \oplus C1 \oplus C0) \cdot Cout1$$
$$C1 = (G1 + P1 \cdot G0 + P1 \cdot P0 \cdot Cin) \cdot Coute + F1 \cdot MODE$$

$$H2 = P2 \cdot \overline{G2} \cdot S10 + P3 \cdot SR + P1 \cdot SL$$

$$H21 = (H2 \cdot H1 + \overline{H2} \cdot \overline{H1}) \cdot \overline{S9} + (\overline{H2} \cdot H1 + H2 \cdot \overline{H1}) \cdot S9$$

$$ALU3 = (C2 \oplus H3) \cdot \overline{Cout1} + Cout1 \cdot CO \cdot [H3 \oplus (G2 \cdot \overline{S9} +$$
$$P2 \cdot G1 \cdot \overline{S9} + P2 \cdot \overline{G1} \cdot S9 + \overline{G2} \cdot G1 \cdot S9)] + Cout1 \cdot \overline{CO}$$
$$[H3 \oplus (\overline{P2} \cdot \overline{P1} \cdot \overline{S9} + G2 \cdot P1 \cdot \overline{S9} + P2 \cdot P1 \cdot S9 + G2 \cdot S9)]$$
$$C2 = (G2 + P2 \cdot G1 + P2 \cdot P1 \cdot G0 + P2 \cdot P1 \cdot P0 \cdot Cin)$$
$$Coute + F1 \cdot MODE$$

$$H3 = P3 \cdot \overline{G3} \cdot S10 + P4 \cdot SR + P2 \cdot SL$$
$$ALU4 = [(GGL + PGL \cdot Cin) \cdot Coute + F1 \cdot MODE] \oplus$$
$$(S10 \cdot P4 \cdot \overline{G4} + P5 \cdot SR + P3 \cdot SL$$
$$ALU5 = C4 \oplus H5 \oplus CoutH$$
$$C4 = (G4 + P4 \cdot GGL + P4 \cdot PGL \cdot Cin) \cdot Coute + F1 \cdot MODE$$

$$H5 = P5 \cdot \overline{G5} \cdot S10 + P6 \cdot SR + P4 \cdot SL$$
$$CoutH = (GGH + PGH \cdot GGL + PGH \cdot PGL \cdot Cin) \cdot S12 +$$
$$(\overline{GGH} \cdot \overline{PGH} + \overline{GGH} \cdot \overline{GGL} \cdot \overline{PGL} + \overline{GGH} \cdot \overline{GGL} \cdot \overline{Cin}) \cdot S9$$

$$ALU6 = (C5 \oplus H6) \cdot \overline{CoutH} + (H65 \oplus C5 \oplus C4) \cdot CoutH$$
$$C5 = (G5 + P5 \cdot G4 + P5 \cdot P4 \cdot GGL + P5 \cdot P4 \cdot PGL \cdot Cin) \cdot Coute + F1 \cdot MODE$$

$$H6 = P6 \cdot \overline{G6} \cdot S10 + P7 \cdot SR + P5 \cdot SL$$

$$H65 = (H6 \cdot H5 + \overline{H6} \cdot \overline{H5}) \cdot \overline{S9} + (\overline{H6} \cdot H5 + H6 \cdot \overline{H5}) \cdot S9$$

$$ALU7 = (C6 \oplus H7) \cdot \overline{CoutH} + CoutH \cdot C4 \cdot [H7 \oplus (G6 \cdot \overline{S9} +$$
$$P6 \cdot G5 \cdot \overline{S9} + P6 \cdot \overline{G5} \cdot S9 + \overline{G6} \cdot G5 \cdot S9)] + CoutH \cdot \overline{C4} \cdot$$
$$[H7 \oplus (\overline{P6} \cdot \overline{P5} \cdot \overline{S9} + G6 \cdot P5 \cdot \overline{S9} + P6 \cdot P5 \cdot S9 + G6 \cdot S9)$$

```
                        -continued
C6 = (G6 + P5 . G5 + P6 . P5 . G4 + P6 . P5 . P4 . GGL +
      P6 . P5 . P4 . PGL . Cin) . Coute + F1 . MODE H7 = P7 . G̅7̅ . S10 + SHOUT . SR + P6 . SL
SHOUT = P7 . SL . CLK
SHCI = PO . SR . CLK
``` where:
S̅H̅O̅U̅T̅ is the MSB of the shift right or left command;
Cin is the carry in signal;
SCHI is the LSB of the shift right or left command;
F1 is a function select input;
Coutl is the BCD carry out signal for the four lower order bits; and
CoutH is the BCD carry out signal for the four higher order bits.

The remaining terms in the ALU equations have been previously identified.

It should be noted that the design was accomplished using negative logic. That is, a logical AND function results when two outputs are connected together.

The above described implementation avoids the use of a nine's complementer in the performance of BCD subtraction. Instead, the one's complement of the subtrahend is added to the minuend using binary arithmetic. If there is no binary carry out, a correction factor of plus ten is added to the result. If there is a carry out, the ALU output is equivalent to the binary sum. For BCD addition, the augend is added to the addend using binary arithmetic. If the sum is ten or greater, the carry out is generated, and a correction factor of plus six must be added to the result. If there is no carry out, the ALU output is equivalent to the binary sum. Thus, the logic used to perform binary arithmetic is used to reduced the amount of logic required to perform BCD addition and subtraction.

In summary, the invention provides the eight-bit expandable ALU which performs binary and BCD arithmetic, logic shifts right and left, and various logic and transfer operations in only four stages of logic delay from data input to ALU output. The improvement in speed and power dissipation permits LSI implementation. Included is an implementation of the Pi and Gi terms in only one stage of delay. Also incuded is a method of combining two correction algorithms together logically without increasing the delay time of BCD and binary arithmetic over that of binary arithmetic alone. The implementation is unique and utilizes the binary logic to reduce the required BCD logic.

While the invention has been described with reference to a particular embodiment thereof, it should be clear that changes in form and details may be made therein without departing from the spirit and scope of the invention.

I claim:

1. An arithmetic logic unit (ALU) for performing binary and BCD arithmetic and a plurality of logic functions on at least first and second data input sets Ai and Bi where i is an integer which varies from 0 to n, comprising:
   selection means for enabling said ALU to perform a desired function, said selection means producting a plurality of enabling signals;
   first logic means coupled to said selection means and to said data input sets for generating propagate (Pi) and generate (Gi) signals informative to the existence of carry out signals which would result from the combination of bits of equal significance in said at least first and second data sets, said first logic means producing said propagate and generate signals in a first single stage of logic delay;
   second logic means coupled to said selection means and to said first logic means for producing group propagate and group generate signals informative of the existence of carry out signals which would result from the combination of predetermined subsets of equal significance of said at least first and second data sets, said second logic means producing said group propagate and group generate signals in a second single stage of logic delay;
   carry look-ahead means coupled to said selection means and to said first and second logic means for generating carry signals Ci in a third single stage of logic delay;
   third logic means coupled to said selection means and to said first logic mens for generating signals Hi representative of half-sums of corresponding bits in said at least first and second data sets, said third logic means producing said half-sums in said second stage of logic delay; and
   fourth logic means coupled to said selection means, to said third logic means and to said carry look-ahead means for combining said half sums Hi and said carry signals Ci to produce a desired ALU output in a fourth single stage of logic delay.

2. An ALU according to claim 1 wherein said selection means enables said ALU to perform both binary and BCD addition and subtraction, shift right and left, logical inversions and logical AND, OR and exclusive OR functions.

3. An ALU according to claim 1 wherein said first logic means comprises a plurality of AND-OR logic circuits, one for each propagate and generate signal to be produced, each of said logic circuits including a plurality of AND gates having inputs coupled to selected ones of said enabling signals and to selected bits of said at least first and second data sets, each of said plurality of AND gates having an output coupled to an input of an OR gate having an output for producing one of said propagate and generate signals.

4. An ALU according to claim 3 wherein said AND functions have inputs coupled to the complement of said selected bits of said at least first and second data sets.

5. An ALU according to claim 3 wherein said first logic means produces propagate signals in accordance with the equation $Pi = Ai + Bi$ where "+" denotes a logical OR and produces generate signals in accordance with the equation $Gi = Ai \cdot Bi$ where "·" denotes a logical AND.

6. An ALU according to claim 5 wherein said first logic means produces both the true and complement forms of said propagate and generate signals.

7. An ALU according to claim 1 wherein said second logic means produces a group propagate signal and a group generate signal for the lower order data bits (PGL and GGL) and a group propagate signal and a group generate signal for the higher order data bits (PGH and GGH).

8. An ALU according to claim 7 wherein n=7 and said second logic means produces group propagate and generate signals for the upper four data bits and group propagate and generate signals for the lower four data bits.

9. An ALU according to claim 3 wherein said third logic means includes means for right-shifting one of said data sets.

10. An ALU according to claim 9 wherein said third logic means includes means for left shifting one of said data sets.

* * * * *

UNITED STATES PATENT AND TRADEMARK OFFICE
CERTIFICATE OF CORRECTION

PATENT NO. : 4,263,660
DATED : April 21, 1981
INVENTOR(S) : Jerry E. Prioste

It is certified that error appears in the above—identified patent and that said Letters Patent is hereby corrected as shown below:

Column 9, line 62, change "producting" to --producing--.

Column 9, line 66, change "to" to --of--.

Column 10, line 27, change "mens" to --means--.

Signed and Sealed this

Twenty-eighth Day of July 1981

[SEAL]

Attest:

Attesting Officer

GERALD J. MOSSINGHOFF

Commissioner of Patents and Trademarks